US007219310B2

(12) United States Patent
Ortega et al.

(10) Patent No.: US 7,219,310 B2

(45) Date of Patent: May 15, 2007

(54) INSTRUCTION GENERATING SYSTEM AND PROCESS VIA SYMBOLIC REPRESENTATIONS

(75) Inventors: Jesus Santoyo Ortega, Aguascalientes (MX); Jose Luis Duenas, Aguascalientes (MX); Rosa Elena Castillo, Aguascalientes (MX); Jésus Esquivel, Aguascalientes (MX); Hugo C. Correa, Rincon de Romos (MX); Mauricio Campos, Aguascalientes (MX); Salvador De Luna, Aguascalientes (MX); Gilberto Esparza, Aguascalientes (MX)

(73) Assignee: Xerox Corporation, Stamford, CT (US)

( * ) Notice: Subject to any disclaimer, the term of this patent is extended or adjusted under 35 U.S.C. 154(b) by 470 days.

(21) Appl. No.: 10/007,358

(22) Filed: Nov. 5, 2001

(65) Prior Publication Data

US 2003/0085933 A1 May 8, 2003

(51) Int. Cl.
*G06F 3/00* (2006.01)
*G06F 17/28* (2006.01)
*G06F 17/27* (2006.01)
*G06K 9/72* (2006.01)

(52) U.S. Cl. .......................... 715/839; 715/764; 704/2; 704/9; 382/229

(58) Field of Classification Search ................ 345/835, 345/839, 865, 771; 715/705, 771, 836, 764, 715/835, 865, 839; 704/2, 9; 382/229
See application file for complete search history.

(56) References Cited

U.S. PATENT DOCUMENTS 4,498,143 A 2/1985 Strzelecki
5,212,635 A * 5/1993 Ferriter ........................ 705/11
5,408,603 A * 4/1995 Van de Lavoir et al. ... 345/763
5,926,189 A * 7/1999 Beaman et al. ............. 345/467
6,321,243 B1 * 11/2001 Ballard ....................... 715/517
6,664,985 B1 * 12/2003 Bormann et al. ........... 345/835
2002/0163544 A1 * 11/2002 Baker et al. ................ 345/835

OTHER PUBLICATIONS

Pine Harbor Shed Co., "How To Build a Shed", copyright 2000. http://www.pineharbor.com/how_to_build_a_shed_1.htm.*
Baby's Dream, 'Convertible "Crib 2000" Instruction Sheet'. http://www.babysdream.com/Service/Assemblns/pdf/Convertible%20Crib%202000%20Instruction%20Sheet.pdf.*
Legare, "43 Straight Desk". http://www.legarefurniture.com/docs/43_straight_desk.pdf.*

* cited by examiner

*Primary Examiner*—Kieu D. Vu
*Assistant Examiner*—Ting Zhou
(74) *Attorney, Agent, or Firm*—Fay Sharpe LLP

(57) ABSTRACT

Glyph instructions are formed which are understandable by a person following the instructions, irrespective of which written language is understood by the person. The glyph instructions follow defined grammar and syntax rules. A plurality of action glyphs are used to represent a plurality of defined actions capable of being undertaken by the person following the instructions. A plurality of material glyphs are defined to represent a plurality of materials which are includable as part of the instruction, and a plurality of instrumentation glyphs are defined to represent a plurality of instruments which may be included in the instructions. Selected ones of the action glyphs, material glyphs and instrumentation glyphs are arranged in relationship to each other in accordance with the predetermined grammar and syntax to form specific instructions understandable by the person following the instruction, irrespective of the written language which is understood by the person.

15 Claims, 9 Drawing Sheets

INSTRUCTION GENERATING SYSTEM AND PROCESS VIA SYMBOLIC REPRESENTATIONS

FIELD OF THE INVENTION

The invention relates to the generation of instructions via the use of symbols such as glyphs, and more particularly to a method and system of generating glyph instructions which may be understood by a user irrespective of the user's written language.

BACKGROUND OF THE INVENTION

In an organization having employees which do not share a common written language, a large number of errors occur due to misunderstandings regarding instructions. For example, in the manufacturing field various manufacturing processes have been standardized in order to improve the efficiency of the manufacturing process. However, it is common that written instructions on how to proceed with a standardized process are not written in the language of the person reading the instructions. Therefore, it is necessary to interpret the instructions for that person, translate those instructions, or obtain assistance from another employee. This results in a waste of both time and resources.

Thus, for a multi-lingual workforce it is desirable to have a unified method of communication. While one option is to require all employees of an organization to speak and read the same language, such an option is unrealistic in large organizations and even small organizations having a diversified population.

Therefore, it would be desirable to provide a communication mechanism which avoids written instruction regarding the manufacturing process, which are in a specific language while also allowing for the passing of complex ideas among people having different languages.

SUMMARY OF THE INVENTION

Glyph instructions are formed which are understandable by a person following the instructions, irrespective of which written language is understood by the person. The glyph instructions follow defined grammar and syntax rules. A plurality of action glyphs are used to represent a plurality of defined actions capable of being undertaken by the person following the instructions. A plurality of material glyphs are defined to represent a plurality of materials which are includable as part of the instruction, and a plurality of instrumentation glyphs are defined to represent a plurality of instruments which may be included in the instructions. Selected ones of the action glyphs, material glyphs and instrumentation glyphs are arranged in relationship to each other in accordance with the predetermined grammar and syntax to form specific instructions understandable by the person following the instruction, irrespective of the written language which is understood by the person.

DETAILED DESCRIPTION OF THE PREFERRED EMBODIMENT

Figure 1:
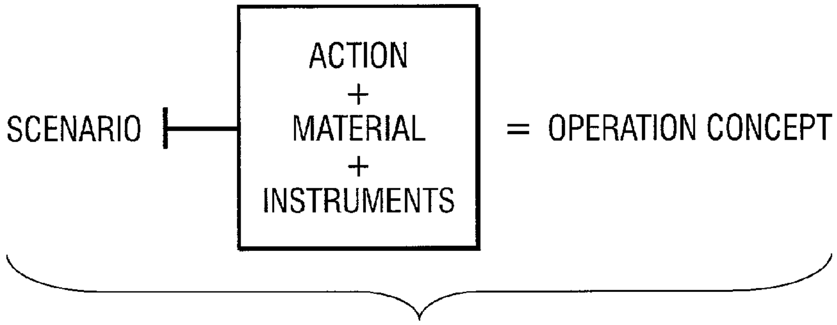
FIG. 1 sets forth the graphical representation of the syntax and grammar which may be used in constructing glyph instructions of the present invention.

Languages, whether they are of the written or spoken variety, are the main communication tool used by humans. However, as is well known, different languages have developed over the millenniums for specific groups. Each of these languages have particularities unique to the understanding of those persons within a group allowing for knowledge to be passed between and shared among those members. While each of these languages do have their unique characteristics, there are some basic coincidences between numerous languages dependent upon their evolution within time and geography. Basically, any language may be separated into its simplest elements, even for the most complex constructions. For example, as a very basic point, western languages base their structures on three common elements, of a subject, verb and object. For example:

| SUBJECT | VERB | OBJECT |
|---|---|---|
| El Proceso | es | muy aburrido |
| O Processo | é | muito aborrecido |
| Il Processo | e' | molto noiso |
| Le Procés | est | vrai enneuyeux |
| The Process | is | so boring |
| De Proces | is | zeer vervelend |
| Die Verzapfungmethode | ist | sehr langweilig |

The structure and the writing for Eastern-based languages were developed in a quite different manner. However, these languages also contain very well-defined rules and structures.

For the Eastern-based languages, a complete idea is intended to be transmitted via each symbol. These symbols which are known as ideograms, are still in use today by many countries in Asia.

Additionally, in countries which do not use such an ideogram-based language, many uses of symbols or icons are implemented such as street signs, and are known and understood world-wide.

In some businesses and organizations individual symbols will indicate concepts such as "No Smoking", "No Trespassing", "Hard Hats to be Worn", or other simple concepts. However, even when these symbols are placed together, they are not connected to each other in a manner to form a complex set of instructions.

The inventors reviewed known manufacturing processes and determined that such processes can be defined as a series of well-organized operations which guide workers. The operations for a particular set of processes were found to include steps of assembling, disassembling, cleaning, tearing components down, repairing, upgrading, transporting, packing, among others.

These steps are preferably defined into the minimum possible actions necessary to perform the operations, and are called "elements of the process" or "components". The present innovation applies rules of grammar and proper syntax to descriptive glyph images representing the elements of the process, as well as part numbers and tooling numbers. The glyphs, part numbers and tooling numbers are arranged in accordance with the accepted grammar and syntax to form complex extended glyph instructions which are simple to follow irrespective of what language the user understands.

To create a set of glyphs for use in glyphs instructions, research is undertaken to understand which different components are involved in the manufacturing process. Once these components are understood, a glyph matrix is generated that represents the breadth of these components. Thereafter the glyph instructions formed according to the syntax are provided to an end user in order to test the glyph instruction system. Modifications can then be made to the glyph instruction according to the results of this testing.

In this embodiment components of the manufacturing process, are defined to include elements such as:

- Instructions: The description of steps needed in order to perform a specific operation,
- Image: Complementary information related to instructions that clarify visual operations,
- Part Numbers: Classes of parts involved within a specific operation,
- Tooling Numbers: Class of toolings involved within a specific operation when needed, and
- Official Local Template: Base document in which information is deployed. It also includes data such as program names, number of elements per process, categorization of elements (e.g. assembling, disassembling, inspection, packaging), engineering responsibility, tooling specifications, program configurations, among others.

In order to discuss the concepts of the present invention in more detail, a manufacturing process has been selected where the process may be divided into four categories. The first category being a disassembling of parts, the second category the assembling of those parts, the third category is the inspection/repair of parts, and the fourth category is the packaging of parts. By means of semiotics, a language used in a manufacturing process was differentiated. Semiotics comes from the Greek word SemeiOtikos meaning observant of signs, from sEmeiousthai to interpret signs, from sEmeion sign, from sEma sign. Semiotics is a general philosophical theory of signs and symbols that deal especially with their function in both artificially constructed and natural languages and comprises syntactics, semantics, and pragmatics.

Using an analysis via semiotics three basic issues were raised in the development of the glyph instruction system. First, an inquiry was made as to whether actions were involved in a specific operation. It was then noted what parts/materials were considered within the manufacturing process, and third which instruments were commonly used in order to perform the operations.

For the action components, a list was generated of verbs which would reflect actions possible in the selected manufacturing processes. In the present embodiment, these verbs include: taking off, disconnecting, cleaning, recovering, recycling, cutting, verifying, assembling, routing, unrouting, connecting, setting, taking from, orienting, aligning, painting, registering on, programming, evaluating, adjusting, fixing, stacking, packaging, checking on, laying on a pallet, and taping.

For the parts/material inquiry, a variety of material components were identified for the manufacturing process of this embodiment. These included, for example, a spring, screw, ring, tie, part (in general). For the instrument components, this example lists either a manual operation or a tooling operation as being required.

Once the components were identified, it was then necessary to define a standard structure in which any concept relating to a manufacturing process could be completed. Looking back to the basic language syntaxes, it was determined that complete concepts could be launched by imitating the normal way in which instructions were set.

This structure as described is shown in graphical format in FIG. 1 where the Scenario is that the operations are being described via images, and the Action, Material and Instruments are used to generate the operational concept or instruction.

Thus, the entire operation conceptualization is provided by the sum of:

- i. The Scenario that represents where the operation is performed via an image,
- ii. The Action, which describes, by means of a glyph, a step of the operation from an element,
- iii. The Material, which presents a glyph of the part involved in the step, and
- iv. The Instrumentation, which describes via a glyph, either a manual operation or use of a tool.

The structure itself makes mandatory the proper use of part or tooling numbers involved in a manufacturing process. Discreet fragments of the information transmitted via the glyph, make it easy to build an element-by-element instruction for a manufacturing process, and the information concisely defined for each glyph makes it easy to create and manage the manufacturing process.

Figure 2:
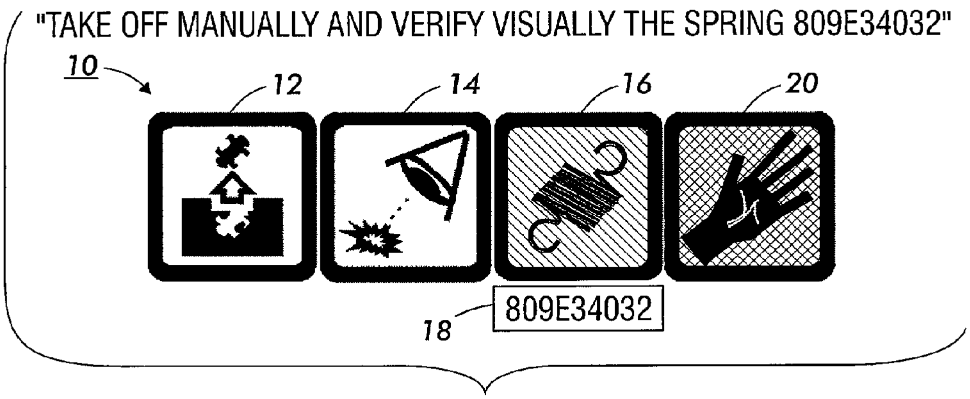
FIG. 2 is a glyph instruction according to the teachings of the present invention.

Turning to FIG. 2, illustrated is an example of an instruction for a manufacturing process of: "Take off manually and verify visually the spring 809E34032."

As can be seen in FIG. 2, this operation instruction 10 is defined via visual image representation of individual glyphs arranged in a proper syntactic order. The first glyph 12 is a representation understood to define the operation or action of taking off a part. The second glyph 14 defines that a visual operation is being undertaken. Glyph 16 represents a part defined as a spring. In addition, a tag 18 representing a part number is provided with the glyph 16. It is noted that part numbers and tooling numbers are able to be used in the symbolic instruction system as for this concept these are not considered a language, but rather are simple alpha/numeric images. A next glyph 20 indicates that the process is to be undertaken manually. Thus, glyphs 12 and 14 define the action portion of the scenario in that the part is to be taken off and visually verified. Glyph 16 defines the material of the process and glyph 18 defines the instrumentation. By providing the proper glyph order, a multi-concept manufacturing process instruction is achieved without the need of a specific written instruction.

Figure 3:
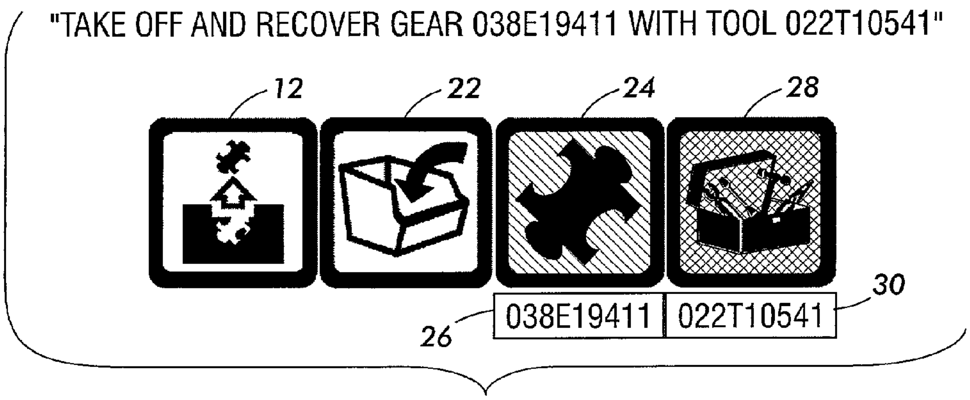
FIG. 3 depicts a second example of a glyph instruction generated in accordance with the teachings of the present invention.

In a second example, as shown in FIG. 3, an instruction in the glyph symbolic language for "Take off and recover gear 038E19411 with tool 022T10541", is set forth. Particularly, in FIG. 3 glyph 12 is arranged as an initial action instructing a user to take off a part. Glyph 22 also provides an action instruction that the person should undertake a recovery operation. Therefore glyphs 1 and 2, in the proper syntactic order, instruct a user to take off and recover a part. Thereafter, the material, i.e. the part, gear 038E19411, is defined as the material or part which is to be recovered by glyph 24 and tag 26. Next, the user is instructed via glyph 28 that the part is to be taken off with a tool, and the tool is defined by tag 30 as tool 022T10541.

It is noted that an intent of the present embodiment is to provide an end user, i.e. a person following the instructions, with a simple process of understanding the manufacturing process to be undertaken. Commonly, the same person generating the glyph instruction is not the person performing the process. Further, many different people may be required to perform the process set forth in the instruction. Therefore, when the generated glyph instruction is tested, the generator of the instruction avoids guiding the worker or user through the operation. Rather, to be a successful symbolic representation, the worker must be able to follow the process without additional guidance. If the process has been correctly developed, no support from the person generating the instruction will be needed. However, if defects in the process are detected during this work-out procedure, such as missing numbers, wrong sequences or absence of information, then the particular glyph instruction may be reviewed or altered and corrections may be made almost immediately.

One manner of determining if the glyph instructions are providing desired process reliability and quality is to measure the number of calls for engineering support when a person is undertaking glyph instructions. One manner of measuring for increased quality is by a calls-per-hundred elements (C.P.H.E.) rating. C.P.H.E. monitors the number of occasions a call is made for engineering support versus the number of times a glyph instruction is performed. The less C.P.H.E., the better quality the process. In this situation, the process quality assessment may be performed by a person in the quality control area. For example, an inspector or quality auditor, apart from the product, may be a suitable option. Such a person would quantify the total calls during a tryout period, which results in a qualification of the process when certain C.P.H.E. parameters are met.

A specific implementation of the glyph instruction process, this allowed an engineer to more quickly implement of the instructions for the process, and workers using the system were able to understand more easily what the manufacturing operations implied. Specifically, it was found during the testing of a particular implementation that there was a 75% decrease in required engineering support during the tryout period, a 75% increase in reliability of the process, a 60% increase in productivity (i.e. less time for process building), only 25% of time dedicated to the process and tryout was required as compared to other process tryouts, and 85% less time was dedicated to corrections.

Figure 4:
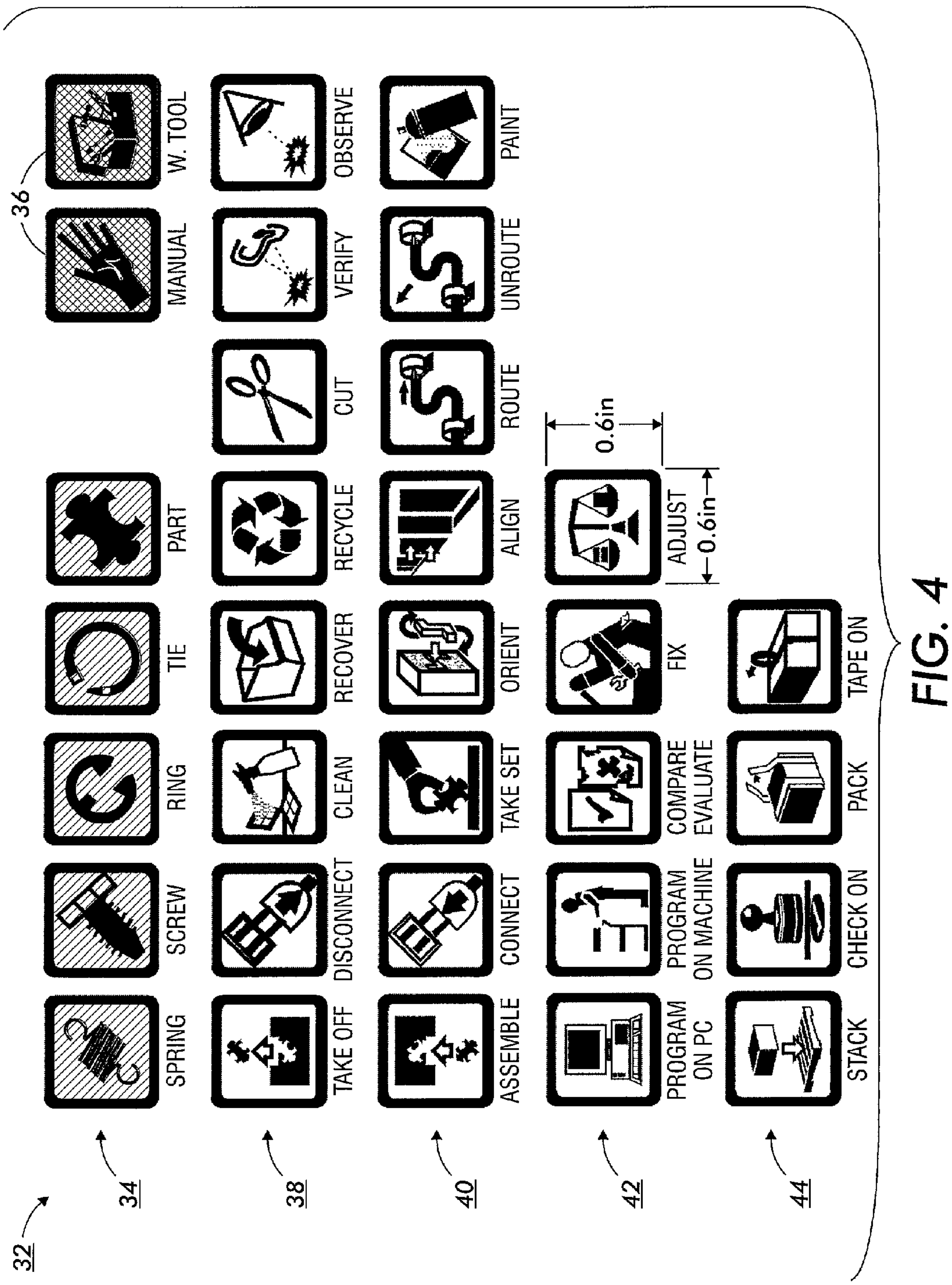
FIG. 4 is a matrix of glyph images used to form glyph instructions.

Turning to FIG. 4, shown is a matrix 32 of glyph codes where an upper row 34 of the matrix contain material glyphs, i.e. spring, screw, ring, tie, part. Another upper row 36 is directed to the instrumentation glyphs used in this example, i.e. manual or with a tool, and rows 38–44 depict action glyphs. It is to be understood that the glyphs of FIG. 3 are simply representative of those which were developed for a particular embodiment of the present invention. It is not intended that the invention be limited to these glyphs or to the manufacturing processes previously described or to be described in this document. Rather, it is understood that other processes may take advantage of the present invention, which will involve other components. These different components may use their own unique glyph images. Further, the components described herein may also be described by images different from those used here. For example, glyph 12 of FIG. 3 which describes the taking off a part may be shown in another image which is understandable by a user.

A further concept which is illustrated in FIG. 4, is that the glyphs for the different components, may be color-coded to enhance the universal understanding. For example, in this embodiment the action glyphs (rows 38–44) have a white background, the material glyphs (row 32) have a green background and the instrumentation glyphs (row 36) have a yellow background. By using unique coloring for different component categories, the user can easily identify the various syntactic elements of the instruction.

In this embodiment the glyphs are shown to be in squares of approximately 0.6 inches by 0.6 inches. It is to be appreciated however, that other sizes and/or shapes may be used. A benefit of the present size, is that it allows the glyph instruction to be placed directly on devices.

Figure 5:
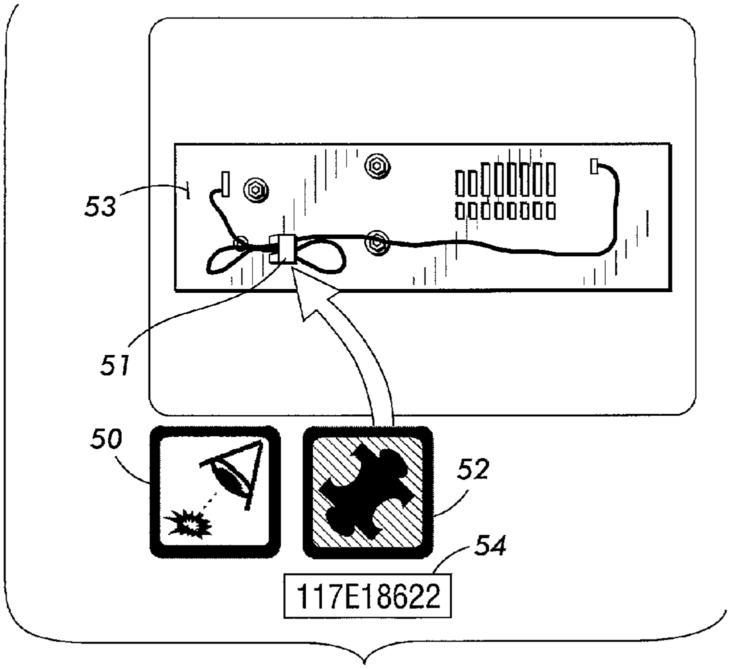
FIG. 5 depicts a view of a picture and the corresponding representative glyph instruction.
Figure 6:
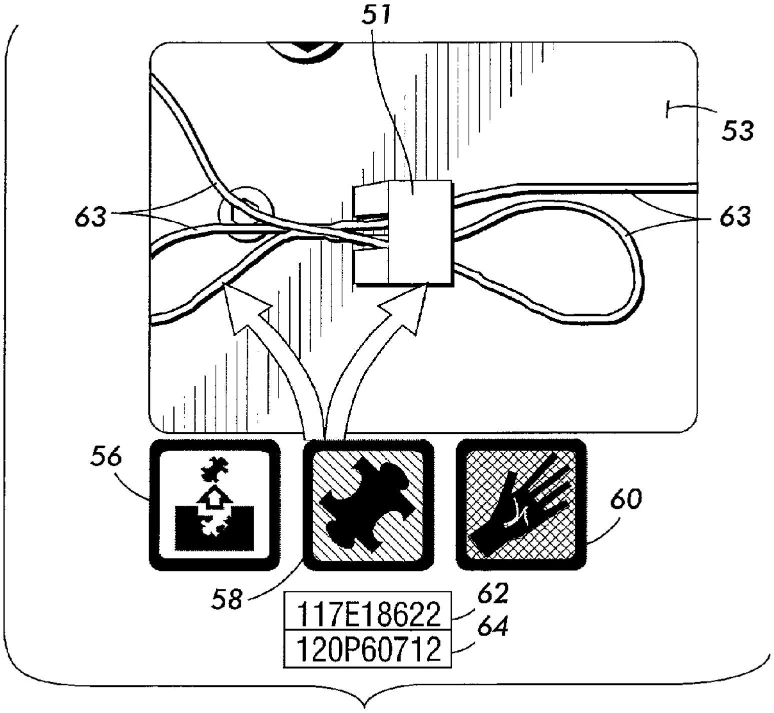
FIG. 6 shows a second example of a glyph instruction related to a device set forth in a picture.
Figure 7:
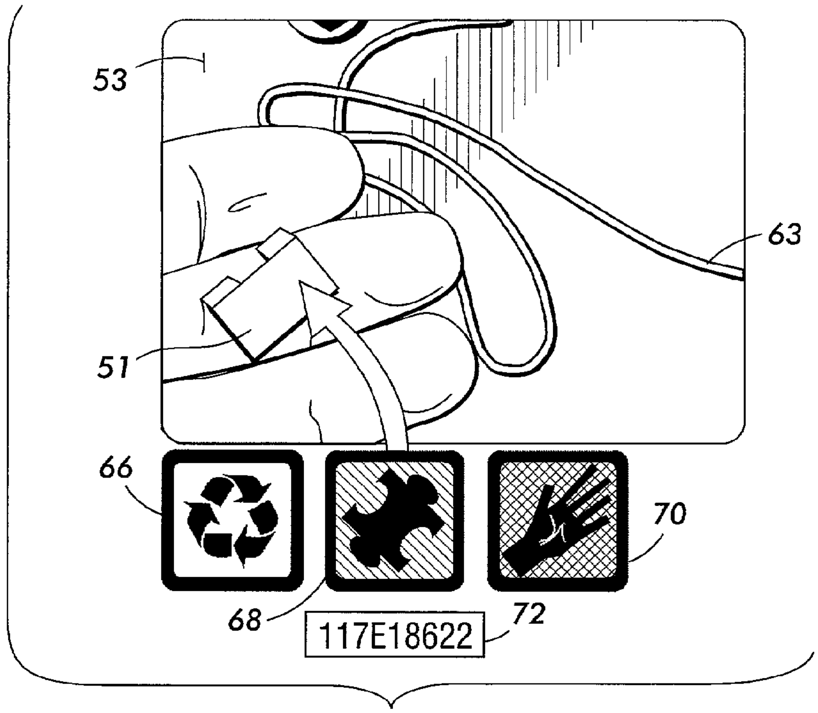
FIG. 7 sets forth a third example of a glyph instruction for a particular component of a device.

Turning to FIGS. 5–7, glyphs from the matrix of FIG. 4 are arranged as glyph instructions for a device shown in the corresponding figures. For example, in FIG. 5 glyphs 50, 52 and tag 54 provide a glyph instruction to visually inspect (glyph 50) a part 51 (glyph 52) having a part number 117E18622 (tag 54). This glyph instruction may be adhered to the backside of panel 53 next to the part number or may be placed on the part 51 itself if properly sized.

In FIG. 6, an instruction is provided by glyphs 56–60 and tags 62 and 64. This glyph instruction tells a person to take off part 51 (glyph 56) where that part is part number 117E18622 (tag 62), and to take off part 63 having a part number 120P60712 (tag 64) and to do this manually (glyph 60). FIG. 6 shows that glyph instructions can use multiple glyphs of the same type of component to generate a compound concept.

Turning to FIG. 7, a glyph instruction is provided via glyph images 66, 68 and 70 and tag 72. In this embodiment, the user is instructed to manually recycle part (117E18622) 51.

Thus, the generation of glyph instructions includes determining components (e.g. in one embodiment we have defined those as actions, materials, and instruments), then individual glyph images representing the various types of components are generated. In some instances the instructions may be constructed simply by cutting and pasting individual glyph images in a sequence in accordance with the syntax and grammar rules. An alternative embodiment provides a computer system to generate the glyph instructions.

Figure 8:
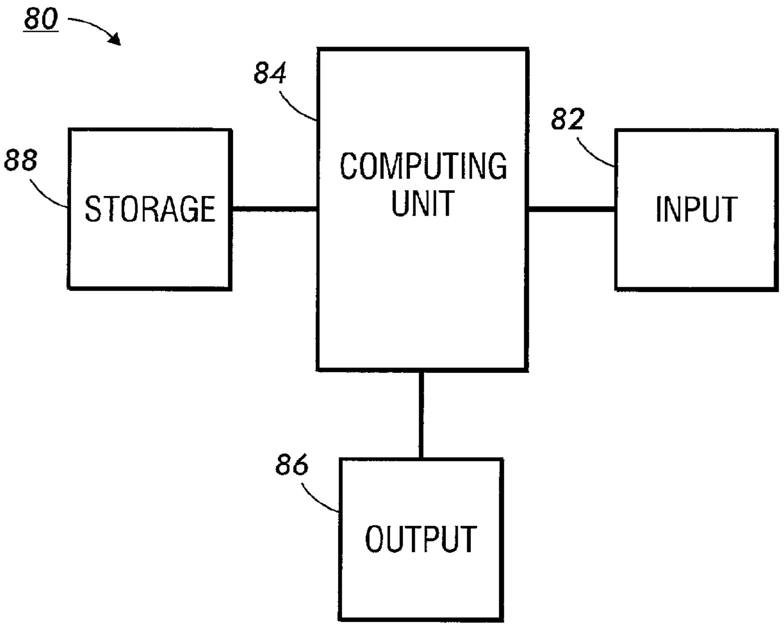
FIG. 8 illustrates a glyph generating system which may be used to form glyph instructions using the concept of the present invention.

Particularly, as shown in FIG. 8, a glyph generating system 80 having an input device 82 which may be a keyboard, mouse, input stylus, voice activation system, touch screen, or other mechanism capable of inputting data into a computing unit or CPU 84 is provided. The computing unit may be a well-known desktop computer, laptop computer, personal data assistant (PDA) as a stand-alone unit or connected to an internal or external computer network such as the Internet or other known electronic system. Also included as part of glyph generating system 80 is an output device 86 used to generate hard copies of the glyph images. The output device 86 may be any one of a multitude of types of printers including those having adhesive backing paper allowing for the generation of stickers. The output device may also be a data display device which will display the images.

In such a computer system, the generated glyph images such as those shown in FIG. 4 may be stored in an electronic storage device 88 which is part of glyph generating system 80. The electronic storage device 88 may be external to the computing unit 84 or integrated as part thereof.

Figure 9:
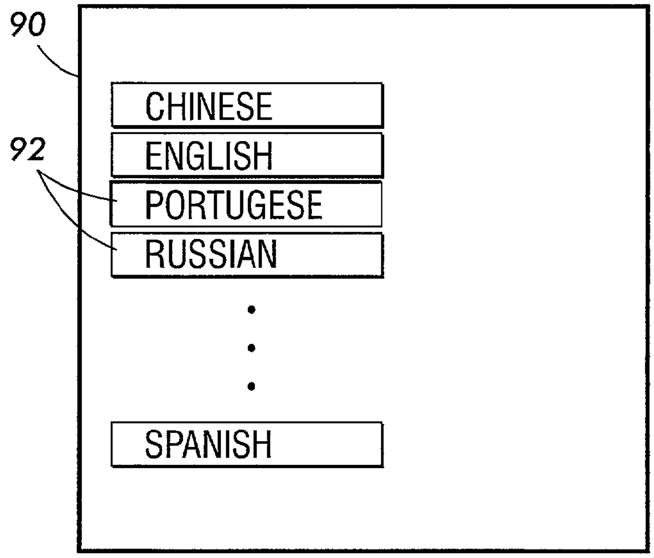
FIG. 9 is a screen viewed by a user of the glyph generating system.

Turning to FIG. 9, shown is an electronic display screen 90 which may be part of the input device 82 or a display of the computing unit 84 of FIG. 8. With attention to the present glyph generation process, a user is presented with a selection among a plurality of languages 92. Selection of a particular language causes the system to operate in a language understandable by a generator of the instructions. It is to be appreciated that what is being discussed at this process is the generation of the instructions.

Upon selection of a particular language, the present embodiment moves to a next screen 94 which has an input section 96 wherein a user may input a written instruction, in a language the generator of the instruction understands, and which is to be generated as a glyph instruction. In this example, a user has input an instruction "Take apart part 117E18622 and visually inspect." When the user then selects Generate Glyph Instruction Button 98, the process moves to automatically translate the requested instruction into the glyph instruction.

Figure 10:
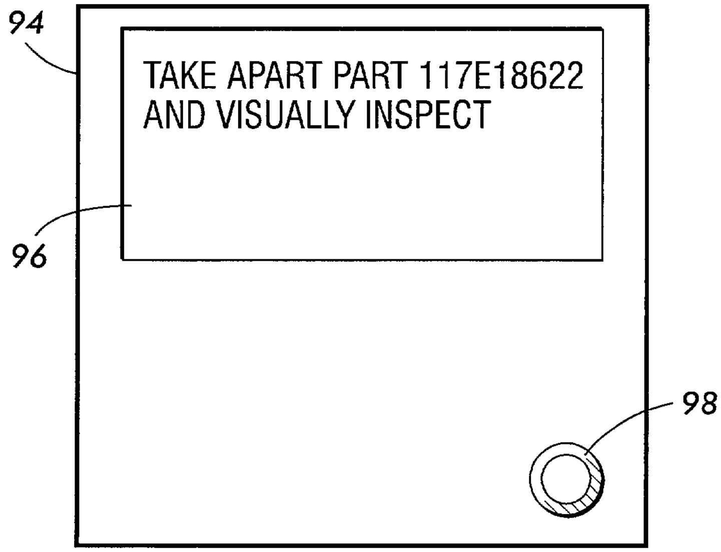
FIG. 10 depicts the input of an instruction to be automatically generated as a glyph instruction.
Figure 11:
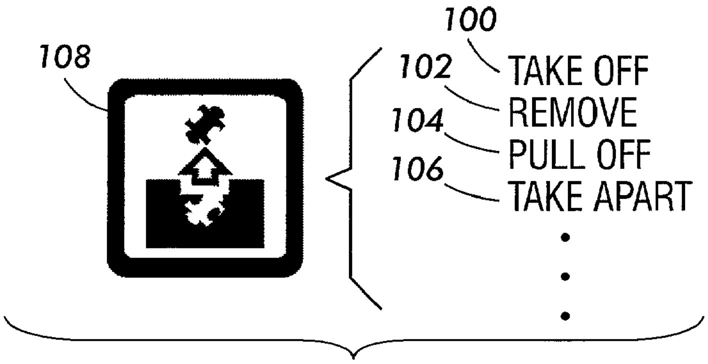
FIGS. 11–13 illustrate the linkage of input words to a specific glyph image.
Figure 12:
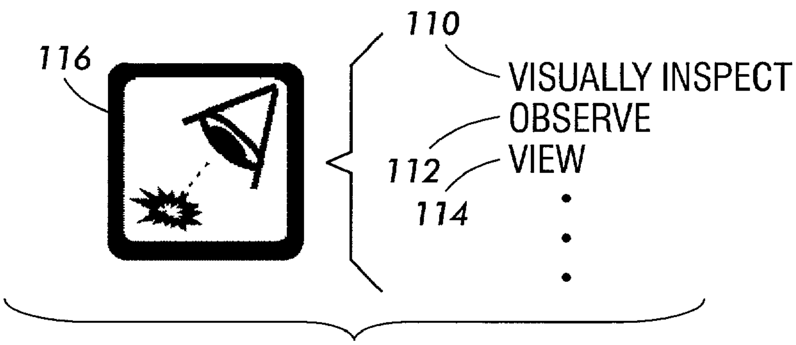
Figure 13:
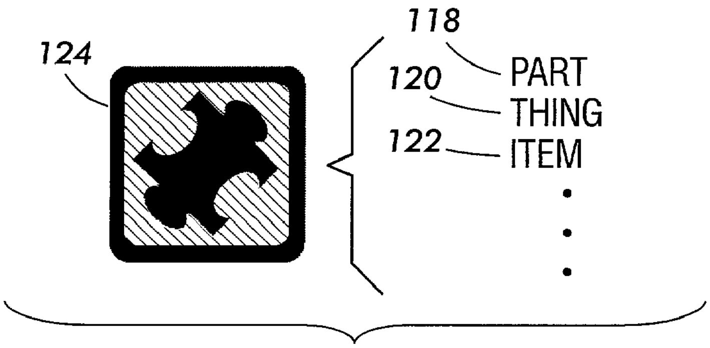
Figure 14:
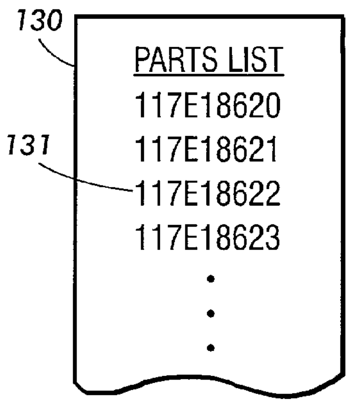
FIG. 14 depicts a parts list page for the glyph system.

With attention to FIG. 11, graphically depicted is the operational flow of glyph generating system 80 which operates to translate the written instructions into a glyph instruction. Particularly, in its database, such as a relational database, various words/phrases are denoted to be equivalent to a particular glyph image. For example, the word/phrases "take off" 100, "remove" 102, "pull off" 104, "take apart" 106 each point to glyph code 108 as shown in FIG. 11. Therefore, when the user's instruction is input from FIG. 10, the system identifies phrases and/or words and matches those to previously stored words equivalent to a particular glyph image. Turning to FIG. 12, the process continues where the phrases/words "visually inspect" 110, "observe" 112, 'view' 114 point to glyph 116. In further proceeding and as shown in FIG. 13, the system next recognizes the word "part" 118, as being stored in a listing also including terms such as "thing" 120, and "item" 122 which are linked to glyph 124. When glyph 124 has been detected, the system identifies that as a part and then undertakes a search for any alpha-numeric string in the written instruction and compares that alpha-numeric string to a portion of the database for "a parts list." This causes, as shown in FIG. 14, the system to search the database under a parts list area 130 which identifies that a certain part (117E 18622) 131 does exist for this detected string of alpha-numeric indicators.

Figure 15:
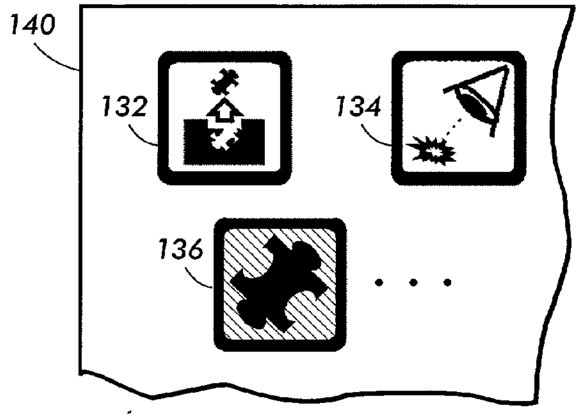
FIG. 15 sets forth an output page sending forth individual glyph images forming a glyph instruction.
Figure 16:
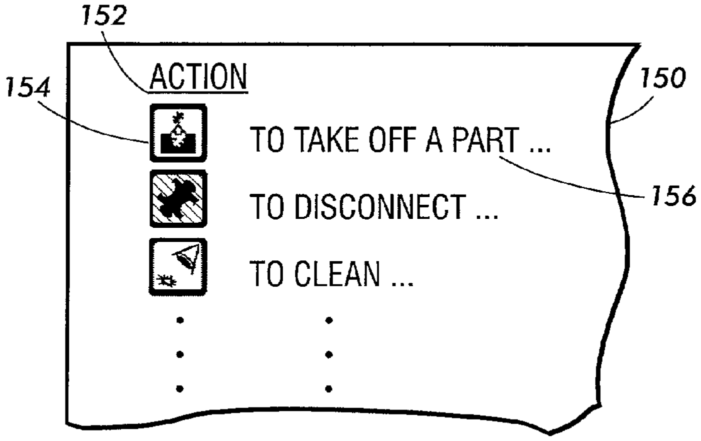
Figure 17:
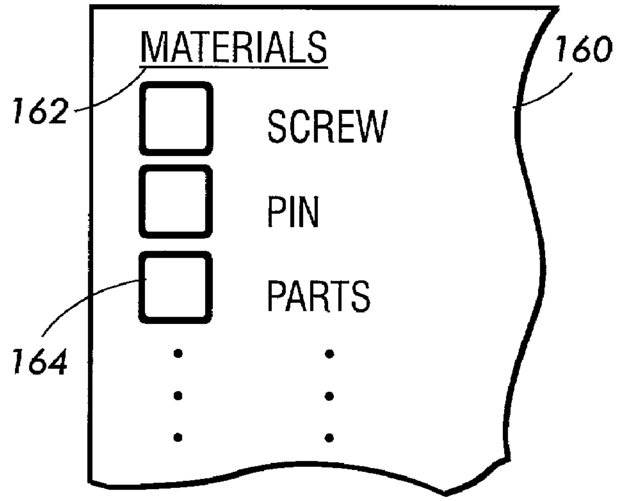
FIGS. 17–20 are computer screens illustrating the process of a second embodiment for generating glyph instructions.
Figure 18:
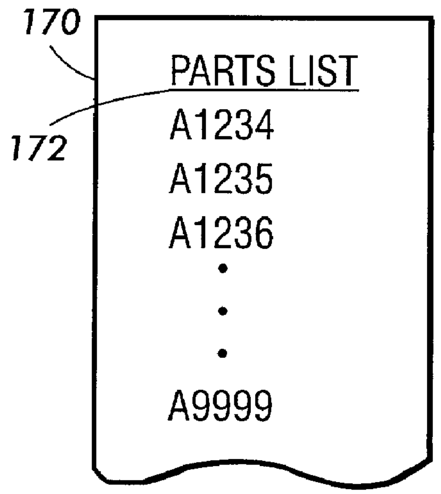

The system 80 thus parses this sentence by use of matching phrases/words to data and relationships previously stored in a database such as database 88 of system 80. Either during the searching process, or after selection of the glyphs, a determination is made as to what component of the operation the glyph corresponds. Particularly, in the syntactic structure of the system previously described, the glyphs would be one of an action glyph, a material glyph or an instrumentation glyph. The proper syntactic and grammar may be achieved by assigning each glyph a designation (numeral, etc.) which requires the appropriate ordering. The selected and ordered glyphs 132, 134, 136 are then displayed on display 140 as shown in FIG. 15.

A person generating the instruction may then view the instruction to determine the correctness of the instruction. Once approved, the person may then generate hard copies of the glyphs via the use of output device 86 of FIG. 8. The glyph instructions may be printed on adhesive-backed material allowing for easy application to devices. Alternatively, they may be printed in an instruction manual or in any other useful format.

Turning to FIGS. 16–20, a further embodiment of the present invention is illustrated, where the embodiment may be accomplished in use with a system such as shown in FIG. 8.

More particularly in this alternative embodiment, following selection of a language from a screen such as that depicted in FIG. 9 a component screen 150 (FIG. 16) presents various components available to a user. In this embodiment, an action component heading 152 is displayed, and available glyphs 154 are displayed with an associated description 156. From this listing the person generating the glyph instruction can manually select the desired glyph images. This process is repeated for each of the component types such as the material component shown in material component page 160 of FIG. 17. Materials are listed under a materials heading 162, and the user can then select a particular material. When the "parts" 164 is selected, the process moves to a parts list page 170 (FIG. 18) where a particular part number 172 for the material may be selected. A similar flow may be implemented for the other materials as well.

Figure 19:
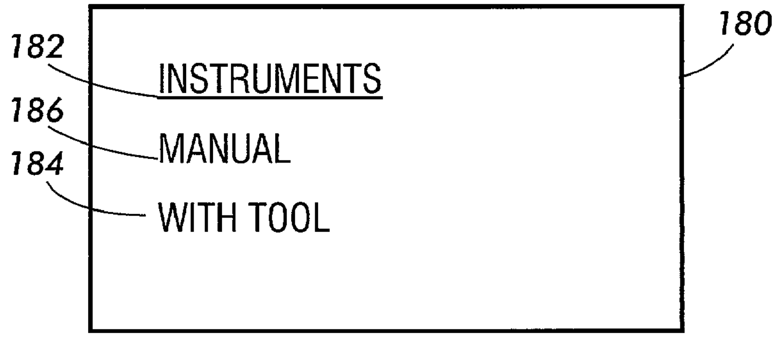
Figure 20:
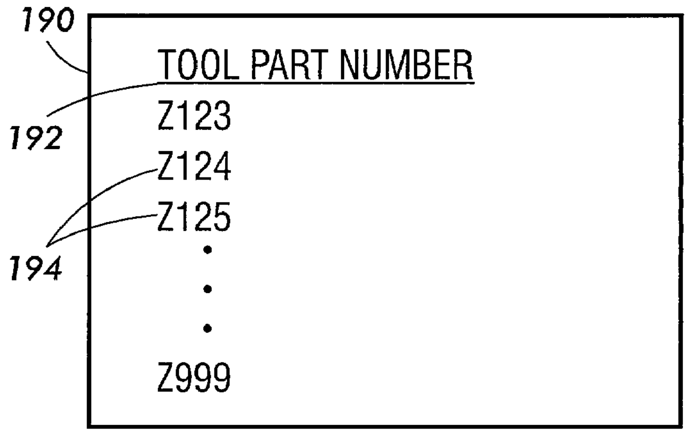

Similarly, with attention to FIG. 19, instrumentation option page 180 includes an Instruments heading 182 under which are provided options for a tool 184 or a manual 186 selection. If the tool selection option is made, the process then moves to a tool part number page 190 such as shown in FIG. 20. "Tool Part Number" heading 192, provides a list of tool part numbers 194. Following this process flow, a user is able to manually generate a glyph instruction. Once an acceptable glyph instruction is formed, it may be displayed for review by a user and then printed out as described in the previous embodiments.

With attention to FIGS. 16–20, it is understood that this process provides a more manual creation of glyph instructions, whereas the embodiment related to FIGS. 10–15 a more automated process.

It is to be understood that other steps for generating glyph instructions are available. For example, the selection of a particular language may not be required as the user may implement a system having only a single language in which to generate glyph instructions.

The forgoing is considered as only illustrative of the principles of the invention. Further, since numerous modifications and changes will readily occur to those skilled in the art, it is not desired to limit the invention to the exact construction and operation as shown and described, and accordingly, all suitable modifications and equivalents may be considered as falling within the scope of the invention.

Having thus described the preferred embodiments, what is claimed is:

1. A method for reducing language-related misunderstanding of instructions by a person following the instructions to perform a process, the method comprising:

receiving at least one written instruction comprising words and phrases, wherein the written instruction is to be generated as a plurality of glyph instructions;

translating the written instruction into the glyph instructions, the translating including:

identifying each of the inputted words and phrases;

matching each of the identified words and phrases to a word or phrase previously stored in a reference, wherein each matching stored word and phrase is equivalent to one of a plurality of available glyph images, each of the available glyph images including a type designation corresponding to one of an action glyph, a material glyph or an instrumentation glyph, and each of the stored glyphs including an ordering designation; and syntactically ordering the matching glyph images based on the type designation and the ordering designation; and generating the glyph instructions, the ordered glyph images forming the generated glyph instructions for the person to perform the process by following the glyph instructions, wherein the generated glyph instructions are not specific to any particular written language so that the person can follow the generated glyph instructions to perform the process regardless of which written language is understood by the person following the generated glyph instructions, and wherein:

a generated action glyph is not a generated material glyph or a generated instrumentation glyph;

the generated material glyph is not the generated instrumentation glyph or the generated action glyph; and the generated instrumentation glyph is not the generated action glyph or the generated material glyph.

2. The method according to claim 1, wherein the generating the glyph instructions step includes generating each of the generated glyphs with a visibly discernable design feature identifying the corresponding type designation of the generated glyph.

3. The method according to claim 2, wherein the visibly discernable design feature is at least one color corresponding to each type designation.

4. The method according to claim 1, wherein:

the receiving step, the translating step and the generating step are performed manually by a user;

the generating the glyph instructions includes cutting and pasting the ordered glyph images to form the generated glyph instructions.

5. The method according to claim 1, wherein the receiving step, the translating step and the generating step are performed by a computer system interacting with a user of the computer system, the computer system having a computing unit, an input device operatively connected to the computing unit for receiving input from the user and displaying information to the user, an electronic storage device operatively connected to the computing unit, and an output device operatively connected to the computing unit, and wherein the reference comprises a reference database stored on the storage device, the method further comprising:

displaying the ordered glyph images to the user;

receiving by the computer system an approval input from the user; and wherein the generating the glyph instructions includes printing the ordered glyph images on the output device to form the generated glyph instructions.

6. The method according to claim 5, the method further comprising:

displaying a list of languages to the user; and receiving a language selection from the user indicating which language corresponds to the received written instruction.

7. In a glyph generating system having a computing unit, an input device operatively connected to the computing unit for receiving input from a user and displaying information to the user, an electronic storage device operatively connected to the computing unit for storing a database, and an output device operatively connected to the computing unit, a method for creating glyph instructions by the glyph generating system for a person to perform a process by following the glyph instructions, the method comprising:

displaying a plurality of available action glyphs to the user of the glyph generating system;

displaying a plurality of available material glyphs to the user of the glyph generating system;

displaying a plurality of available instrumentation glyphs to the user of the glyph generating system;

receiving an ordered plurality of selections from the user by the glyph generating system, each of the selections selected from one of the available action glyphs, material glyphs and instrumentation glyphs, wherein the selections are ordered to arrange the selected action glyphs, material glyphs and instrumentation glyphs in accordance with a predetermined structure;

displaying the arranged selected glyphs to the user; and outputting the arranged selected glyphs, the arranged selected glyphs forming glyph instructions for the person to perform the process by following the glyph instructions, wherein the glyph instructions are independent of any particular written language, and wherein each of the selected glyphs includes a visibly discernable design feature identifying the corresponding type designation of the selected glyph.

8. The method according to claim 7, the method further comprising:

displaying a list of languages to the user; and receiving a language selection from the user thereby causing the glyph generating system to operate in the language selected by the user while having no effect on the outputted arranged selected glyphs.

9. The method according to claim 8, wherein receiving an ordered plurality of selections from the user includes:

displaying an action heading, a materials heading and an instrumentation heading to the user;

receiving a heading selection of one of the action heading, the materials heading and the instrumentation heading from the user;

based on the receiving a heading selection, displaying an glyph selection list including one of a plurality of available actions, a plurality of available materials and a plurality of available instruments; and receiving a selection from the user of one element of the displayed glyph selection list.

10. The method according to claim 9, wherein the displayed glyph selection list includes descriptive information for each element in the selection list in the language selected by the user.

11. A pictographic system for creating glyph instructions for a person following the glyph instructions to perform a process, irrespective of a written language used by the person following the glyph instructions, the system comprising:

a computing unit;

an input device operatively connected to the computing unit for receiving input from a user and displaying information to the user;

an electronic storage device operatively connected to the computing unit for storing a database;

an output device operatively connected to the computing unit for generating hard copies of created glyph instructions;

wherein the computing unit is configured to perform the steps of at least one of an automated glyph creation process and a manual glyph creation process;

wherein the automated glyph creation process includes:

receiving a written instruction comprising words and phrases inputted by a user of the glyph generating system, wherein the written instruction is to be generated as the created glyph instructions;

translating the written instruction into the glyph instructions, the translating including:

identifying each of the inputted words and phrases;

matching each of the identified words and phrases to a previously stored word or phrase in the database, the matching stored word or phrase equivalent to one of a plurality of stored glyph images in the database, each of the stored glyph images including an associated type designation corresponding to one of an action glyph, a material glyph or an instrumentation glyph, and each of the stored glyphs including an ordering designation; and syntactically ordering the matching glyph images based on the type designation and the ordering designation;

displaying the ordered glyphs to the user;

receiving an approval input from the user; and outputting the ordered glyph images based on the received approval, the ordered glyph images forming glyph instructions for the person to perform the process by following the glyph instructions, and the glyph instructions are not specific to any particular written language so that the person can follow the instructions to perform the process regardless of which written language is understood by the person following the glyph instructions, and each of the ordered glyph images includes a visibly discernable design feature identifying the corresponding type designation of the ordered glyph image;

and wherein the manual glyph creation process includes:

displaying a plurality of available action glyphs stored in the database to a user of the glyph generating system;

displaying a plurality of available material glyphs stored in the database to the user of the glyph generating system;

displaying a plurality of available instrumentation glyphs stored in the database to the user of the glyph generating system;

receiving an ordered plurality of selections from the user, each of the selections selected from one of the available action glyphs, available material glyphs and available instrumentation glyphs;

displaying the selected available glyphs to the user; and outputting the selected available glyphs, the selected available glyphs forming the glyph instructions for the person to perform the process by following the glyph instructions, and the glyph instructions are independent of any particular written language, and each of the selected available glyphs includes a visibly discernable design feature identifying the corresponding type designation of the selected available glyph.

12. The pictographic system according to claim 11, the automated glyph creation process further including:

displaying a list of languages to the user; and receiving a language selection from the user indicating which language corresponds to the received written instruction.

13. The pictographic system according to claim 11, the manual glyph creation process further including:

displaying a list of languages to the user; and receiving a language selection from the user thereby causing the pictographic system to operate in the language selected by the user while having no effect on the outputted selected available glyphs.

14. The pictographic system according to claim 13, wherein receiving an ordered plurality of selections from the user includes:

displaying an action heading, a materials heading and an instrumentation heading to the user;

receiving a heading selection of one of the action heading, the materials heading and the instrumentation heading from the user;

based on the receiving a heading selection, displaying an glyph selection list including one of a plurality of available actions, a plurality of available materials and a plurality of available instruments; and receiving a selection from the user of one element of the displayed glyph selection list.

15. The pictographic system according to claim 14, wherein the displayed glyph selection list includes descriptive information for each element in the selection list in the language selected by the user.

* * * * *